US010527758B2

(12) United States Patent
Yoo et al.

(10) Patent No.: US 10,527,758 B2
(45) Date of Patent: Jan. 7, 2020

(54) COMPOSITION FOR FORMING DYE TYPE POLARIZER AND DYE TYPE POLARIZER

(71) Applicant: LG CHEM, LTD., Seoul (KR)

(72) Inventors: Dong Woo Yoo, Daejeon (KR); Sung-Ho Chun, Daejeon (KR); Kyung Chang Seo, Daejeon (KR); Hyeong Bin Jang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 516 days.

(21) Appl. No.: 15/033,450

(22) PCT Filed: Dec. 22, 2014

(86) PCT No.: PCT/KR2014/012639
§ 371 (c)(1),
(2) Date: Apr. 29, 2016

(87) PCT Pub. No.: WO2015/099377
PCT Pub. Date: Jul. 2, 2015

(65) Prior Publication Data
US 2016/0274274 A1 Sep. 22, 2016

(30) Foreign Application Priority Data

Dec. 27, 2013 (KR) .......... 10-2013-0166209
Dec. 19, 2014 (KR) .......... 10-2014-0184900

(51) Int. Cl.
*G02B 1/08* (2006.01)
*G02B 5/30* (2006.01)
*C09B 35/021* (2006.01)
*G02B 5/26* (2006.01)
*C09B 69/10* (2006.01)
*C09B 29/12* (2006.01)
*C09B 31/043* (2006.01)
*C09B 31/062* (2006.01)
*C09B 31/18* (2006.01)

(52) U.S. Cl.
CPC .............. *G02B 1/08* (2013.01); *C09B 29/12* (2013.01); *C09B 31/043* (2013.01); *C09B 31/062* (2013.01); *C09B 31/18* (2013.01); *C09B 35/021* (2013.01); *C09B 69/106* (2013.01); *G02B 5/26* (2013.01); *G02B 5/3033* (2013.01)

(58) Field of Classification Search
CPC .......... G02B 1/08; G02B 5/3033; G02B 5/26; G02F 1/1335; C09K 19/38; C09K 19/56; B05D 5/00; B05D 3/06; C09B 29/12; C09B 31/043; C09B 31/062; C09B 31/18; C09B 35/021; C09B 69/106
See application file for complete search history.

(56) References Cited

U.S. PATENT DOCUMENTS

| | | | |
|---|---|---|---|
| 6,423,799 B1 | 7/2002 | Berneth et al. | |
| 6,686,980 B1* | 2/2004 | Ichihashi | C09K 19/3852 349/96 |
| 8,623,476 B2 | 1/2014 | Morishima et al. | |
| 2004/0164272 A1 | 8/2004 | Buchecker et al. | |
| 2009/0190073 A1 | 7/2009 | Yoshino et al. | |
| 2010/0134726 A1 | 6/2010 | Morishima et al. | |
| 2011/0017838 A1 | 1/2011 | Delbaere et al. | |
| 2012/0021141 A1* | 1/2012 | Yoo | C09K 19/38 428/1.2 |

FOREIGN PATENT DOCUMENTS

| | | |
|---|---|---|
| CN | 101336275 A | 12/2008 |
| CN | 101750662 A | 6/2010 |
| CN | 103333083 A | 10/2013 |
| CN | 103336325 A | 10/2013 |
| CN | 103364861 A | 10/2013 |
| EP | 1462485 A1 | 9/2004 |
| JP | 56-64301 A | 6/1981 |
| JP | 57-84409 A | 5/1982 |
| JP | 62-69202 A | 3/1987 |
| JP | 08-278409 A | 10/1996 |
| JP | 2000-514468 A | 10/2000 |
| JP | 2001-133630 A | 5/2001 |
| JP | 2004-535483 A | 11/2004 |
| JP | 2006-058801 A | 3/2006 |
| JP | 2007-316617 A | 12/2007 |
| JP | 2009-538957 A | 11/2009 |
| JP | 2010-150513 A | 7/2010 |
| JP | 2010-164975 A | 7/2010 |
| JP | 2010-215846 A | 9/2010 |
| JP | 2011-215337 A | 10/2011 |
| JP | 2011-237513 A | 11/2011 |
| JP | 2011-246696 A | 12/2011 |
| JP | 2012-027471 A | 2/2012 |
| JP | 5225839 B2 | 7/2013 |
| JP | 2013-210624 A | 10/2013 |
| KR | 2001-0070033 A | 7/2001 |
| KR | 10-2005-0123121 A | 12/2005 |
| KR | 10-2007-0005739 A | 1/2007 |
| KR | 10-2008-0023131 A | 3/2008 |
| KR | 10-2008-0094801 A | 10/2008 |
| KR | 10-0982394 B1 | 9/2010 |
| KR | 10-2011-0063854 A | 6/2011 |
| KR | 10-2012-0011796 A | 2/2012 |
| KR | 10-2012-0031882 A | 4/2012 |
| KR | 10-1307494 B1 | 9/2013 |
| TW | 200643575 | 12/2006 |
| TW | 201211217 A | 3/2012 |
| TW | 201348762 A * | 12/2013 ............... G02B 5/30 |
| WO | 2005034099 A2 | 4/2005 |
| WO | 2006/101211 A1 | 9/2006 |

(Continued)

*Primary Examiner* — Bijan Ahvazi
(74) *Attorney, Agent, or Firm* — Dentons US LLP

(57) ABSTRACT

The present invention relates to a composition for forming a dye-type polarizer, which can be used to provide a dye-type polarizer showing excellent degree of polarization, heat resistance and dichroic ratio, and to a dye-type polarizer. The composition for forming a dye-type polarizer includes a curable anisotropic dye having a particular chemical structure; and an orientation auxiliary agent having a predetermined chemical structure.

16 Claims, No Drawings

(56) References Cited

FOREIGN PATENT DOCUMENTS

| WO | 2007/145159 A1 | 12/2007 |
| WO | 2009112206 A2 | 9/2009 |
| WO | 2012/011792 A2 | 1/2012 |

* cited by examiner

COMPOSITION FOR FORMING DYE TYPE POLARIZER AND DYE TYPE POLARIZER

This application is a National Stage Entry of International Application No. PCT/KR2014/012639, filed on Dec. 22, 2014, and claims the benefit of and priority to Korean Application No. 10-2013-0166209, filed on Dec. 27, 2013, and Korean Application No. 10-2014-0184900, filed on Dec. 19, 2014, all of which are incorporated herein by reference in their entirety for all purposes as if fully set forth herein.

TECHNICAL FIELD

The present invention relates to a composition for forming a dye-type polarizer, which can be used to provide a dye-type polarizer showing excellent degree of polarization, heat resistance, and dichroic ratio at the same time, and to a dye-type polarizer.

BACKGROUND

A film-type polarizer is, also known as a sheet polarizer, generally an optical member capable of polarizing light in a specific direction, and widely used in display devices, such as liquid crystal displays, etc. For example, the film-type polarizer is widely used in a liquid crystal display device in order to selectively transmit only light of a specific direction of the light emitted from a backlight and the light passing through a liquid crystal layer, and to control polarization.

As the film-type polarizer, a polarizer using a stretched polyvinyl alcohol (PVA) film stained with a dichroic dye has been the most frequently used in the liquid crystal display devices, etc.

However, since the polarizer using the stretched PVA film shows poor heat resistance and moisture resistance, its optical performances may be reduced by water penetration or relaxation of polymers. For this reason, this polarizer is sandwiched between protection films such as TAC, etc. to be attached to the liquid crystal display device. Further, an adhesive film is needed to attach this polarizer to the liquid crystal display device, which makes the polarizer have an overall thickness of 70-150 μm.

Due to such thickness, poor heat resistance and moisture resistance of the polarizer, there have been actually limitations in application of the polarizer using the stretched PVA film. Therefore, it was difficult to apply the polarizer using the stretched PVA film to new fields which require application of the polarizer, for example, smarter shade, anti-reflection films for OLEDs, etc.

Meanwhile, in order to solve the problems of the polarizer using the stretched PVA film, it has been suggested and studied to use a dye-type polarizer which is in the form of a thin film or a film including a dye layer having an oriented dichroic dye as a main component. Such dye-type polarizer exhibits excellent degree of polarization due to the dichroic dye, which is oriented in the dye layer using an additional alignment film.

However, it was found that this dye-type polarizer also exhibits relatively poor heat resistance. For example, when the existing dye-type polarizer was exposed to a high temperature of about 80° C. to test its heat resistance, orientation of the dichroic dye and degree of polarization of the polarizer were found to be greatly reduced, which may be attributed to randomization of the dichroic dye orientation in the dye layer due to heat energy.

In order to solve this problem, it was tried that an oriented liquid crystal material (a liquid crystal polymer, etc.) is added as a host in the dye layer so as to provide a dye-type polarizer showing more stable orientation of dichroic dye and improved heat resistance. However, this trial was also unsuccessful, and thus there is a continuous demand for a dye-type polarizer that exhibits superior heat resistance to maintain excellent orientation of the dye layer and high degree of polarization when exposed to heat at a high temperature.

SUMMARY OF THE INVENTION

The present invention provides a composition for forming a dye-type polarizer, which can be used to provide a dye-type polarizer showing excellent degree of polarization, heat resistance, and dichroic ratio at the same time.

Further, the present invention provides a dye-type polarizer showing excellent degree of polarization, and more improved heat resistance and dichroic ratio, which is obtained by using the composition.

Furthermore, the present invention provides a display device including the dye-type polarizer.

The present invention provides a composition for forming a dye-type polarizer including a curable anisotropic dye of the following Chemical Formula 1; and an orientation auxiliary agent of the following Chemical Formula 2 or 3 or a radical polymer thereof:

[Chemical Formula 1]

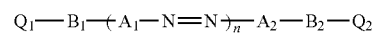

wherein n may be an integer of 2 to 5, in which two or more of a repeating unit of $-(A_1-N=N)-$ may be the same as or different from each other, respectively, at least one of $Q_1$ and $Q_2$ may be a curable unsaturated functional group, and the other may be hydrogen, alkyl having 1 to 20 carbon atoms, alkoxy having 1 to 20 carbon atoms, alkylester having 1 to 20 carbon atoms, or amine, $A_1$ and $A_2$ may be the same as or different from each other, and may be substituted or unsubstituted arylene having 6 to 40 carbon atoms, or substituted or unsubstituted heteroarylene having 4 to 30 carbon atoms, $B_1$ and $B_2$ may be the same as or different from each other, and may be a divalent functional group in a combination of one or more selected from the group consisting of a single bond, $-(C=O)O-$, $-O(C=O)-$, substituted or unsubstituted alkylene having 1 to 20 carbon atoms, substituted or unsubstituted arylene having 6 to 40 carbon atoms, substituted or unsubstituted heteroarylene having 4 to 30 carbon atoms, substituted or unsubstituted alkyleneoxide having 1 to 20 carbon atoms, $-O-$, $-S-$, $-NR_1-$ and $-PR_1-$, and $R_1$ may be hydrogen or alkyl having 1 to 20 carbon atoms, $Q_3\text{-}B_3\text{-}A_3\text{-}N=N\text{-}A_4\text{-}B_4\text{-}Q_4$     [Chemical Formula 2]

wherein at least one of $Q_3$ and $Q_4$ may be a curable unsaturated functional group, and the other may be hydrogen, alkyl having 1 to 20 carbon atoms, alkoxy having 1 to 20 carbon atoms, alkylester having 1 to 20 carbon atoms, $-CN$, $-NO_2$, halogen, or amine substituted or unsubstituted with 1 or 2 of alkyl having 1 to 6 carbon atoms, $A_3$ and $A_4$ may be the same as or different from each other, and may be substituted or unsubstituted arylene having 6 to 40 carbon atoms, or substituted or unsubstituted heteroarylene having 4 to 30 carbon atoms, $B_3$ and $B_4$ may be the same as or different from each other, and may be a divalent functional group in a combination of one or more selected from the group consisting of a single bond, —(C=O)O—, —O(C=O)—, substituted or unsubstituted alkylene having 1 to 20 carbon atoms, substituted or unsubstituted arylene having 6 to 40 carbon atoms, substituted or unsubstituted heteroarylene having 4 to 30 carbon atoms, substituted or unsubstituted alkyleneoxide having 1 to 20 carbon atoms, —O—, —S—, —$NR_2$— and —$PR_2$—, and $R_2$ is hydrogen or alkyl having 1 to 20 carbon atoms,

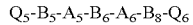
[Chemical Formula 3]

wherein at least one of $Q_5$ and $Q_6$ may be a curable unsaturated functional group, and the other may be hydrogen, alkyl having 1 to 20 carbon atoms, cycloalkyl having 3 to 12 carbon atoms, aryl having 6 to 40 carbon atoms, alkoxy having 1 to 20 carbon atoms, alkylester having 1 to 20 carbon atoms, —CN, —$NO_2$, halogen, or amine substituted or unsubstituted with 1 or 2 of alkyl having 1 to 6 carbon atoms, $A_5$ and $A_6$ may be the same as or different from each other, and may be substituted or unsubstituted arylene having 6 to 40 carbon atoms, or substituted or unsubstituted heteroarylene having 4 to 30 carbon atoms, $B_5$, $B_6$ and $B_8$ may be the same as or different from each other, and may be a divalent functional group in a combination of one or more selected from the group consisting of a single bond, —(C=O)O—, —O(C=O)—, substituted or unsubstituted alkylene having 1 to 20 carbon atoms, substituted or unsubstituted arylene having 6 to 40 carbon atoms, substituted or unsubstituted heteroarylene having 4 to 30 carbon atoms, substituted or unsubstituted alkyleneoxide having 1 to 20 carbon atoms, —O—, —S—, —$NR_3$— and —$PR_3$—, and $R_3$ is hydrogen or alkyl having 1 to 20 carbon atoms.

Further, the present invention provides a dye-type polarizer including a dye layer containing a cured product of the composition for forming a dye-type polarizer.

Furthermore, the present invention provides a display device including the dye-type polarizer.

Advantageous Effects

The composition for forming a dye-type polarizer of the present invention includes a specific curable anisotropic dye and an orientation auxiliary agent. The curable anisotropic dye includes curable unsaturated functional groups at its ends, which are oriented and then copolymerized together with the orientation auxiliary agent by curing so as to form a crosslinking structure. Therefore, this crosslinking structure stabilizes orientation of the anisotropic dye and the dye layer, thereby preventing randomization of the orientation even though exposed to heat at a high temperature.

Further, the orientation auxiliary agent is a component that exhibits excellent orientation and also binds to the curable anisotropic dye to form the crosslinking structure, thereby further improving orientation and dichroic ratio of the dye layer.

Therefore, the composition for forming a dye-type polarizer is used to maintain high orientation and degree of polarization of the dye layer even though exposed to heat at a high temperature, and consequently, to provide a dye-type polarizer having high degree of polarization and more improved heat resistance. Further, the orientation auxiliary agent functions as a host in the dye layer, and further improves orientation of the anisotropic dye at the same time, and the orientation auxiliary agent as it is may also function as the anisotropic dye, thereby further improving degree of polarization of the dye-type polarizer. Therefore, the composition for forming a dye-type polarizer is used to provide a dye-type polarizer having excellent properties such as degree of polarization, transmittance, heat resistance and dichroic ratio.

Such dye-type polarizer is effectively replaced for the existing polarizer using a stretched PVA film, and overcomes the limitations of the existing dye-type polarizer to exhibit excellent properties.

DETAILED DESCRIPTION OF THE EMBODIMENTS

Hereinafter, a composition for forming a dye-type polarizer and a dye-type polarizer according to embodiments of the present invention will be described in detail.

An embodiment of the present invention provides a composition for forming a dye-type polarizer including a curable anisotropic dye of the following Chemical Formula 1; and an orientation auxiliary agent of the following Chemical Formula 2 or 3 or a radical polymer thereof:

[Chemical Formula 1]

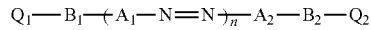

wherein n may be an integer of 2 to 5, in which two or more of a repeating unit of -($A_1$-N=N)— may be the same as or different from each other, respectively, at least one of $Q_1$ and $Q_2$ may be a curable unsaturated functional group, and the other may be hydrogen, alkyl having 1 to 20 carbon atoms, alkoxy having 1 to 20 carbon atoms, alkylester having 1 to 20 carbon atoms, or amine, $A_1$ and $A_2$ may be the same as or different from each other, and may be substituted or unsubstituted arylene having 6 to 40 carbon atoms, or substituted or unsubstituted heteroarylene having 4 to 30 carbon atoms, $B_1$ and $B_2$ may be the same as or different from each other, and may be a divalent functional group in a combination of one or more selected from the group consisting of a single bond, —(C=O)O—, —O(C=O)—, substituted or unsubstituted alkylene having 1 to 20 carbon atoms, substituted or unsubstituted arylene having 6 to 40 carbon atoms, substituted or unsubstituted heteroarylene having 4 to 30 carbon atoms, substituted or unsubstituted alkyleneoxide having 1 to 20 carbon atoms, —O—, —S—, —$NR_1$— and —$PR_1$—, and $R_1$ may be hydrogen or alkyl having 1 to 20 carbon atoms,

 [Chemical Formula 2]

wherein at least one of $Q_3$ and $Q_4$ may be a curable unsaturated functional group, and the other may be hydrogen, alkyl having 1 to 20 carbon atoms, alkoxy having 1 to 20 carbon atoms, alkylester having 1 to 20 carbon atoms, —CN, —$NO_2$, halogen, or amine substituted or unsubstituted with 1 or 2 of alkyl having 1 to 6 carbon atoms, $A_3$ and $A_4$ may be the same as or different from each other, and may be substituted or unsubstituted arylene having 6 to 40 carbon atoms, or substituted or unsubstituted heteroarylene having 4 to 30 carbon atoms, $B_3$ and $B_4$ may be the same as or different from each other, and may be a divalent functional group in a combination of one or more selected from the group consisting of a single bond, —(C=O)O—, —O(C=O)—, substituted or unsubstituted alkylene having 1 to 20 carbon atoms, substituted or unsubstituted arylene having 6 to 40 carbon atoms, substituted or unsubstituted heteroarylene having 4 to 30 carbon atoms, substituted or unsubstituted alkyleneoxide having 1 to 20 carbon atoms, —O—, —S—, —NR$_2$— and —PR$_2$—, and R$_2$ is hydrogen or alkyl having 1 to 20 carbon atoms,

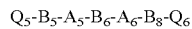

Q$_5$-B$_5$-A$_5$-B$_6$-A$_6$-B$_8$-Q$_6$     [Chemical Formula 3]

wherein at least one of Q$_5$ and Q$_6$ may be a curable unsaturated functional group, and the other may be hydrogen, alkyl having 1 to 20 carbon atoms, cycloalkyl having 3 to 12 carbon atoms, aryl having 6 to 40 carbon atoms, alkoxy having 1 to 20 carbon atoms, alkylester having 1 to 20 carbon atoms, —CN, —NO$_2$, halogen, or amine substituted or unsubstituted with 1 or 2 of alkyl having 1 to 6 carbon atoms, A$_5$ and A$_6$ may be the same as or different from each other, and may be substituted or unsubstituted arylene having 6 to 40 carbon atoms, or substituted or unsubstituted heteroarylene having 4 to 30 carbon atoms, B$_5$, B$_6$ and B$_8$ may be the same as or different from each other, and may be a divalent functional group in a combination of one or more selected from the group consisting of a single bond, —(C=O)O—, —O(C=O)—, substituted or unsubstituted alkylene having 1 to 20 carbon atoms, substituted or unsubstituted arylene having 6 to 40 carbon atoms, substituted or unsubstituted heteroarylene having 4 to 30 carbon atoms, substituted or unsubstituted alkyleneoxide having 1 to 20 carbon atoms, —O—, —S—, —NR$_3$— and —PR$_3$—, and R$_3$ is hydrogen or alkyl having 1 to 20 carbon atoms.

The above described composition of an embodiment includes both the curable anisotropic dye of Chemical Formula 1 and the orientation auxiliary agent of Chemical Formula 2 or 3 or a radical polymer thereof in a non-curable azo-based dye structure applied to the existing dichroic dye, etc, in which both ends of the curable anisotropic dye are introduced with unsaturated functional groups being curable by heat or photo radiation such as UV light.

More specifically, the curable anisotropic dye of Chemical Formula 1 has a chemical structure, in which one or more of an azo group are linked to (hetero)arylene to form functional groups to be oriented by a lower alignment film, and the curable unsaturated functional groups are introduced at the ends of the chemical structure. Further, the orientation auxiliary agent of Chemical Formula 2 or in the form of a radical polymer thereof may also have a chemical structure, in which the azo group and (hetero)arylene are linked to form orientable functional groups, and the curable unsaturated functional groups are introduced at the ends of the chemical structure. Additionally, the orientation auxiliary agent of Chemical Formula 3 or in the form of a radical polymer thereof may also include an aromatic group of (hetero)arylene to exhibit excellent orientation, thereby further enhancing orientation of the anisotropic dye and the dye layer including the same.

Accordingly, when the composition of an embodiment including the curable anisotropic dye and the orientation auxiliary agent is used to form the dye layer of the dye-type polarizer, which is oriented and then irradiated with heat or UV, the respective unsaturated functional groups at ends of the oriented anisotropic dye and the orientation auxiliary agent are cured and/or polymerized with each other to form a crosslinking structure. Since formation of the crosslinking structure stabilizes orientation of the anisotropic dye and the dye layer, randomization of the orientation may be greatly reduced even though exposed to heat at a high temperature.

Therefore, the composition of an embodiment is used to maintain high orientation of the dye layer and high degree of polarization when exposed to heat at a high temperature, thereby providing a dye-type polarizer having high dichroic ratio and degree of polarization, and more improved heat resistance.

Further, the orientation auxiliary agent may function as a host of the curable anisotropic dye in the dye layer, and may further improve orientation of the anisotropic dye, and the orientation auxiliary agent as it is may also function as the anisotropic dye. Therefore, the orientation auxiliary agent may further improve degree of polarization of the dye-type polarizer which is formed by the composition of an embodiment. The composition for forming a dye-type polarizer of an embodiment is used to provide a dye-type polarizer having excellent properties such as degree of polarization, transmittance, heat resistance, dichroic ratio, etc.

Such dye-type polarizer may be effectively replaced for the existing polarizer using a stretched PVA film, and overcomes the limitations of the existing dye-type polarizer to exhibit excellent properties.

Meanwhile, in the respective structure of the curable anisotropic dye or the orientation auxiliary agent included in the composition of an embodiment, the unsaturated functional groups of Q$_1$ to Q$_6$ may be any unsaturated functional groups which are known to be cured, crosslinked and/or polymerized by heat or photo radiation such as UV light. Representative examples of the unsaturated functional group may include a (meth)acrylate group, an epoxy group, a vinyl group or any functional group including these groups at its ends. Q$_1$ to Q$_6$ may be each independently the same or different unsaturated functional groups, and properly the same (meth)acrylate or epoxy groups. As the crosslinking structure is formed by proper curing, orientation of the anisotropic dye, the orientation auxiliary agent and the dye layer including the same may be further stabilized when exposed to heat at a high temperature, thereby effectively inhibiting randomization of the orientation.

Further, in the respective structure of the curable anisotropic dye or the orientation auxiliary agent, the groups other than the unsaturated functional groups in Q$_1$ to Q$_6$ may be each independently hydrogen, alkyl having 1 to 20 carbon atoms, aryl having 6 to 40 carbon atoms, alkoxy having 1 to 20 carbon atoms, alkylester having 1 to 20 carbon atoms, —CN, halogen, or amine substituted or unsubstituted with 1 or 2 of alkyl having 1 to 6 carbon atoms.

Further, A$_1$ to A$_6$ may be each independently arylene having 6 to 40 carbon atoms, which is substituted or unsubstituted with alkoxy having 1 to 20 carbon atoms, alkyl having 1 to 20 carbon atoms, halogen, —NO$_2$ or alkylester having 1 to 6 carbon atoms.

When the particular arylene structures of A$_1$ to A$_6$ are included, and the terminal Q$_1$ to Q$_6$ are the above described functional groups in the structures of the curable anisotropic dye and the orientation auxiliary agent, the anisotropic dye, the orientation auxiliary agent and the dye layer including the same may be more effectively oriented by the lower alignment layer, and excellent orientation of the dye layer and superior degree of polarization of the dye-type polarizer may be secured.

In the structures of the curable anisotropic dye and the orientation auxiliary agent, B$_1$ to B$_8$ are divalent functional groups which serve as linkers to link the terminal (unsaturated) functional groups with the orientable azo groups and (hetero)arylene. Each of B$_1$ to B$_8$ may be the above described divalent functional group, or a divalent functional group which is prepared by linking two or more selected from the above described divalent functional groups in a combination. Further, $B_1$ to $B_8$ may be the same as each other, but it is also apparent that $B_1$ to $B_8$ may be different from each other, considering the kind of arylene groups or terminal functional groups which are linked by the linker.

However, in terms of electron density change or solubility of the curable anisotropic dye or the orientation auxiliary agent, it is preferable that $B_1$ to $B_8$ are each independently a divalent functional group selected from the group consisting of a single bond, —(C=O)O—, —O(C=O)—, alkylene having 1 to 20 carbon atoms, arylene having 6 to 40 carbon atoms, alkyleneoxide having 1 to 20 carbon atoms, —O-(alkylene having 1 to 20 carbon atoms)-, and an amine group which is substituted or unsubstituted with alkyl having 1 to 6 carbon atoms.

In the structure of the curable anisotropic dye of Chemical Formula 1, n may be an integer of 2 to 5, or an integer of 2 to 4. That is, as the linkage structure of the orientable azo group and (hetero)arylene are properly repeated, the curable anisotropic dye exhibits excellent orientation, and the orientation of the anisotropic dye is more effectively stabilized by the crosslinking structure of the terminal unsaturated functional groups, thereby providing a dye-type polarizer having excellent heat resistance. Further, since n is an integer of 2 or more, two or more of the repeating unit of —($A_1$-N=N)— are included. The same repeating units may be included in the structure of the anisotropic dye, but different repeating units of —($A_1$-N=N)— may be also included in the structure of the anisotropic dye.

Further, in the structure of Chemical Formula 1 of the above described curable anisotropic dye, the orientation auxiliary agent, or a reactive mesogen described below, "those substituted or unsubstituted" with substituents means that they encompass those further substituted with a specific substituent as well as each substituent itself. Herein, examples of the substituent further substituted in each substituent may include —CN, —NO$_2$, amine, alkylester, halogen, nitrile, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, sillyl, siloxy or the like.

A specific example of the above described curable anisotropic dye of Chemical Formula 1 may include a compound selected from the group consisting of the following Chemical Formulae 1a to 1f, but is not limited thereto. It is apparent that any curable anisotropic dye belonging to Chemical Formula 1 is used without limitation, thereby providing a dye-type polarizer having excellent degree of polarization and heat resistance.

[Chemical Formula 1a]

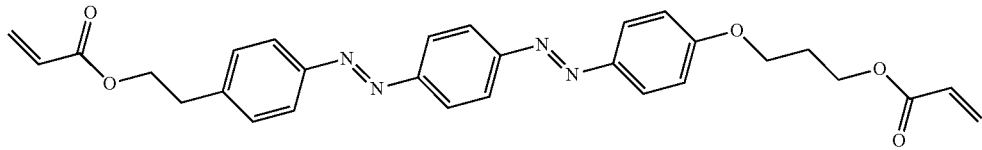

[Chemical Formula 1b]

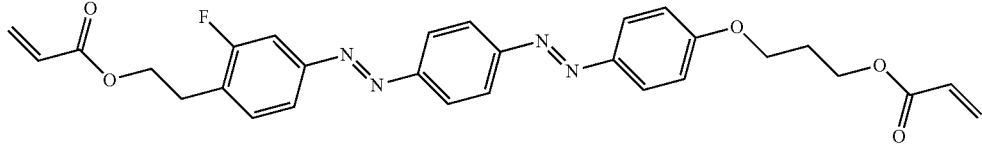

[Chemical Formula 1c]

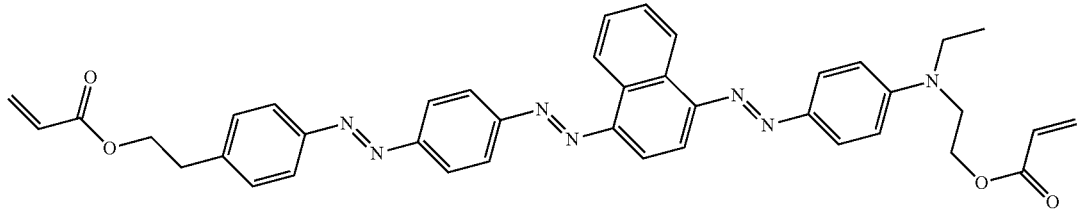

[Chemical Formula 1d]

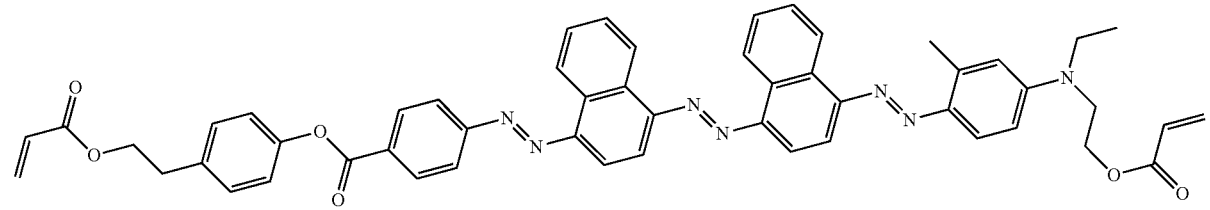

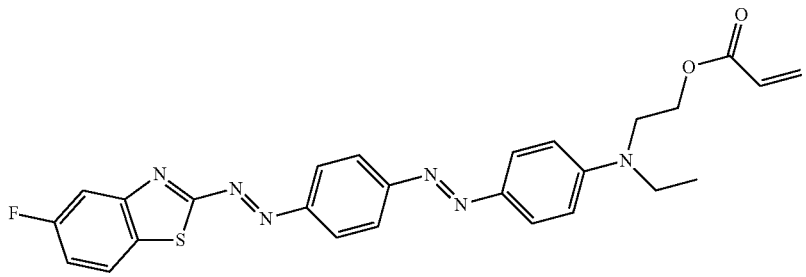

[Chemical Formula 1e]

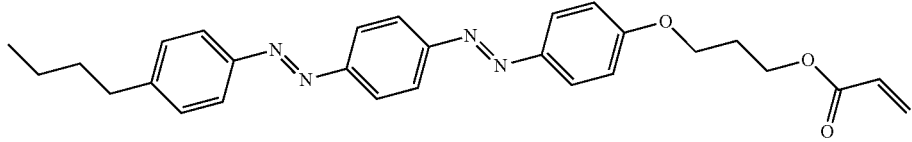

[Chemical Formula 1f]

The above described curable anisotropic dye may be prepared by a method of introducing unsaturated functional groups such as a (meth)acrylate group, an epoxy group or a vinyl group at the ends of the known non-curable azo-based dye having anisotropic or dichroic property. However, this preparation method may differ depending on the typical reaction conditions and method of introducing the respective functional groups according to the kind of the unsaturated functional group. Specific reaction conditions and method are also described in the following Examples, and thus additional descriptions thereof will be omitted.

In the composition for forming a dye-type polarizer of an embodiment, a mixture of 1 to 5 kinds of dyes may be used so that the above described curable anisotropic dye has a proper color according to its use. Generally, the anisotropic dye of Chemical Formula 1 has a rod- or bar-like structure. Even though they are mixed with each other, the dye layer including the same may be easily oriented according to orientation of the lower alignment layer, and the dye-type polarizer formed from the composition may exhibit superior degree of polarization.

Meanwhile, the composition of an embodiment may further include an orientation auxiliary agent of Chemical Formula 2 or 3 or in the form of a radical polymer thereof. Definition of the specific functional groups (that is, specific example and definition of $A_3$ to $A_6$, $B_3$ to $B_8$, and $Q_3$ to $Q_6$) in the structure of Chemical Formula 2 or 3 is the same as described in Chemical Formula 1, and thus additional descriptions will be omitted.

However, the orientation auxiliary agent may be included in the form of a monomer of Chemical Formula 2 or 3, as well as a radical polymer prepared by linking the terminal unsaturated groups of Chemical Formula 2 or 3 to each other by radical polymerization thereof. When the orientation auxiliary agent may be included in the form of the radical polymer, orientation of the above described curable anisotropic dye, and dichroic ratio and degree of polarization of the polarizer obtained from the composition of an embodiment may be properly improved, and orientation of the dye layer may be further stabilized to improve heat resistance.

The orientation auxiliary agent in the form of the radical polymer may be prepared by radical polymerization using the compound of Chemical Formula 2 or 3 as a monomer according to a typical method, and the agent may have a weight average molecular weight of, for example, about 1000 to 30000, or about 2000 to 15000, or about 3000 to 10000.

Further, since the orientation auxiliary agent includes unsaturated functional groups of $Q_3$ to $Q_6$ at least one end thereof, as shown in the structure of Chemical Formula 2 or 3, it forms a crosslinking structure together with the above described curable anisotropic dye by proper curing, thereby further stabilizing orientation of the anisotropic dye and the dye layer including the same even though exposed to heat at a high temperature, and more effectively inhibiting randomization of the orientation.

Further, since the orientation auxiliary agent includes the arylene structure of $A_3$ to $A_6$, it exhibits excellent orientation, and further improves orientation of the above described curable anisotropic dye, and dichroic ratio and degree of polarization of the polarizer obtained from the composition of an embodiment. Furthermore, since the orientation auxiliary agent of Chemical Formula 2 include an azo group which is the same as that in the curable anisotropic dye of Chemical Formula 1 so as to show excellent interaction therewith, orientation of the anisotropic dye and dichroic ratio and degree of polarization of the polarizer may be further improved.

Additionally, the above described particular divalent functional group of $B_3$ to $B_8$ may be included as a linker, thereby properly controlling the electron density change of the orientation auxiliary agent and the composition of an embodiment.

The above described orientation auxiliary agent of Chemical Formula 2 or 3, or a radical polymer thereof may be prepared by a method known to those skilled in the art or may be purchased from commercially available sources.

A specific example of the above described orientation auxiliary agent may include a compound selected from the group consisting of the following Chemical Formulae 2a to 2d and Chemical Formulae 3a to 3f or a radical polymer obtained from one or more thereof as a monomer, but is not limited thereto. It is apparent that any orientation auxiliary agent belonging to Chemical Formula 2 or 3 or a radical polymer thereof is used without limitation, thereby providing a dye-type polarizer having excellent dichroic ratio, degree of polarization and heat resistance.

[Chemical Formula 2a]

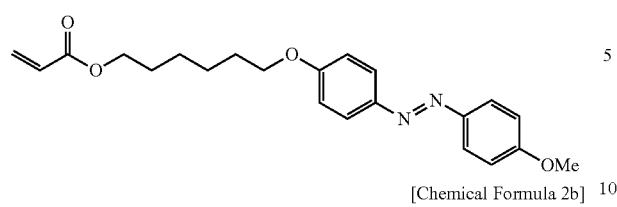

[Chemical Formula 2b]

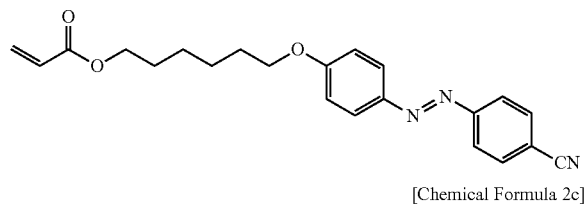

[Chemical Formula 2c]

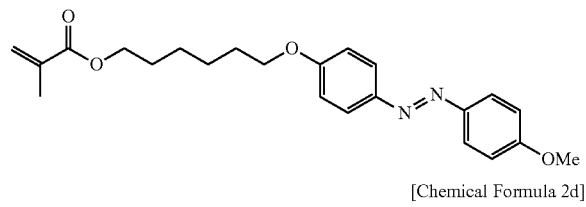

[Chemical Formula 2d]

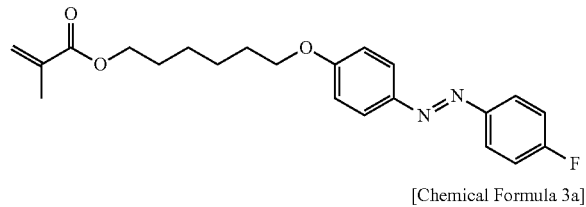

[Chemical Formula 3a]

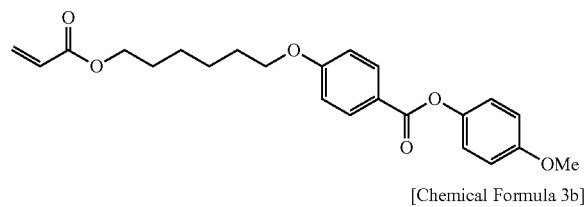

[Chemical Formula 3b]

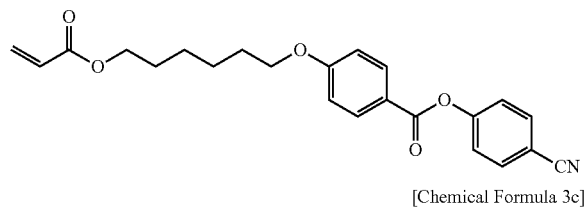

[Chemical Formula 3c]

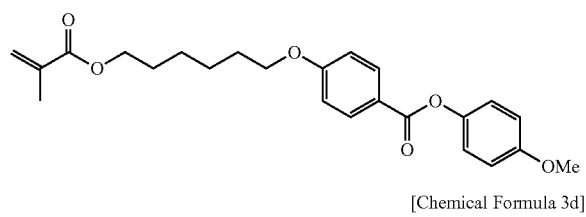

[Chemical Formula 3d]

[Chemical Formula 3e]

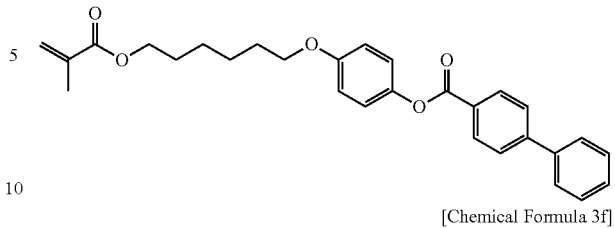

[Chemical Formula 3f]

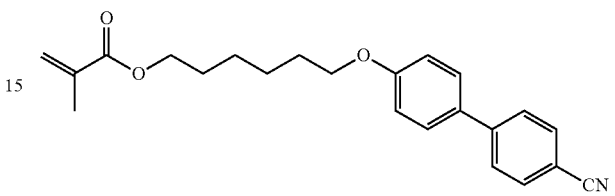

Meanwhile, the composition for forming a dye-type polarizer of an embodiment may further include a reactive mesogen together with the above described curable anisotropic dye and orientation auxiliary agent. The "reactive mesogen (RM)" as known previously refers to a material that includes a polymerizable, crosslinkable, or curable unsaturated group in its molecule to be polymerized, crosslinked, or cured by UV irradiation, and also includes one or more mesogen groups to show liquid crystal phase behavior, and the reactive mesogen also has a curable unsaturated group.

Such reactive mesogen is also cured together with the above described curable anisotropic dye and orientation auxiliary agent to form a crosslinking structure, thereby further stabilizing orientation of the anisotropic dye and inhibiting randomization of the orientation even though exposed to heat at a high temperature. Accordingly, degree of polarization and heat resistance of the dye-type polarizer may be further improved.

Further, addition of the reactive mesogen may further improve orientation and dichroic ratio of the anisotropic dye and the polarizer, thereby providing a dye-type polarizer having very excellent properties.

As the reactive mesogen, any material may be used without limitation, as long as the material includes an unsaturated group to be polymerized and/or cured by UV irradiation, and also includes the mesogen group to show liquid crystal phase behavior. However, in order to obtain a polarizer having excellent heat resistance by more effectively forming the crosslinking structure together with the curable anisotropic dye or the orientation auxiliary agent and to obtain a polarizer having superior properties by further improving orientation or dichroic ratio of the curable anisotropic dye and the dye layer including the same, a compound of the following Chemical Formula 4 may be properly used:

[Chemical Formula 4]

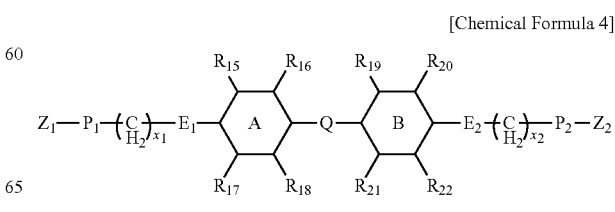

wherein A and B are each independently arylene having 6 to 40 carbon atoms, or cycloalkylene having 6 to 12 carbon atoms or 6 to 8 carbon atoms, $R_{15}$ to $R_{22}$ are each independently selected from the group consisting of hydrogen, halogen of chlorine or fluorine, —CN, alkyl having 1 to 12 carbon atoms, aryl having 6 to 40 carbon atoms, alkoxy having 1 to 12 carbon atoms, and alkoxycarbonyl having 1 to 12 carbon atoms, $E_1$ and $E_2$ are each independently a single bond, —O—, —S—, —CO—, —COO—, —OCO—, —CH=CH—COO—, —OCO—CH=CH—, —C=C—, —OCH$_2$— or —CH$_2$O—, $Z_1$ and $Z_2$ are each independently a (meth)acrylate group, $P_1$, $P_2$ and Q are each independently the same as in A, $E_1$ or $Z_1$, and $x_1$ and $x_2$ are each independently an integer of 0 to 12.

Further, to achieve more improved dichroic ratio of the polarizer which is obtained from the composition of an embodiment, A and B in Chemical Formula 4 are phenylene or cyclohexylene, in which at least one of A and B is properly phenylene.

The reactive mesogen containing the compound of Chemical Formula 4 may be prepared by a method known to those skilled in the art or purchased from commercially available sources.

Meanwhile, the composition for forming a dye-type polarizer of an embodiment may further include a multifunctional binder containing two or more curable unsaturated functional groups, together with the above described components. As the multifunctional binder is further included, unsaturated functional groups of the multifunctional binder are cured, crosslinked or polymerized together with the unsaturated functional groups included in other components such as the anisotropic dye, etc., so as to form a crosslinking structure and to form a crosslinking copolymer of the curable anisotropic dye, the orientation auxiliary agent, and optionally, the reactive mesogen and the multifunctional binder, and a dye layer including the same, when curing is carried out after orientation of the above described curable anisotropic dye. Therefore, even though the dye layer and the dye-type polarizer are exposed to heat at a high temperature, orientation of the anisotropic dye may be more effectively stabilized and a dye-type polarizer having superior heat resistance may be provided. Furthermore, addition of the multifunctional binder may increase degree of cure of the dye layer and the dye-type polarizer, thereby further improving mechanical properties.

As the multifunctional binder, a multifunctional (meth)acrylate-based compound having a bi- or higher (meth)acrylate group may be properly used. More specifically, examples of the multifunctional (meth)acrylate-based compound may include one or more selected from the group consisting of pentaerythritol triacrylate, tris(2-acrylolyloxyethyl)isocynurate, trimethylolpropane triacrylate and dipentaerythritol hexaacrylate, and two or more selected therefrom may be also used.

The above described composition of an embodiment may include about 1 to 25 parts by weight of the curable anisotropic dye, about 50 to 95 parts by weight of the orientation auxiliary agent, and about 1 to 45 parts by weight of the reactive mesogen, based on 100 parts by weight of the solid content of the total composition. Additionally, the composition of an embodiment may further include about 0 to 49 parts by weight of the multifunctional binder, based on 100 parts by weight of the solid content.

Consequently, it is possible to form a dye layer having excellent orientation which is not reduced by heat at a high temperature and to provide a dye-type polarizer having higher degree of polarization and transmittance, and superior dichroic ratio and heat resistance.

Further, the composition of an embodiment may further include an organic solvent to dissolve or disperse the above described components, and if necessary, the composition may further include an initiator such as a thermal initiator or a photoinitiator to aid curing of the respective components such as the curable anisotropic dye, etc. As the organic solvent, a proper organic solvent may be selected by those skilled in the art to effectively dissolve or disperse the respective components such as the curable anisotropic dye and the orientation auxiliary agent. As the thermal initiator or the photoinitiator, an initiator capable of effectively curing the unsaturated functional groups of the curable anisotropic dye or the orientation auxiliary agent may be properly selected and used.

Specific examples of the organic solvent may include methylene chloride (MC), chloroform, cyclopentanone, cyclohexanone, toluene, xylene, dioxane, N-methyl pyrrolidone (NMP), propyleneglycol monomethyletheracetate (PGMEA), butyl cellosolve, ethyl cellosolve, butanol, ethanol, ethyl acetate, anisole, cyclohexane, water, methyl isobutyl ketone (MIBK), methyl ethyl ketone (MEK), propylene glycol, acetonitrile, tetrahydrofuran (THF), diethyl ether, glycerin or 2-pyrrolidone, and specific examples of the thermal initiator or photoinitiator may include commercial photoinitiators with the name of the Irgacure series, for example, Irgacure 184, 819, 907 or 369.

Meanwhile, another embodiment of the present invention provides a dye-type polarizer including a cured product of the above described composition for forming a dye-type polarizer.

In an example of the dye-type polarizer, the cured product included in the dye layer may include a crosslinking copolymer having a crosslinking structure of the curable unsaturated functional groups of the curable anisotropic dyes and orientation auxiliary agents resulting from copolymerization of the components, in which at least a part of the curable anisotropic dye may be oriented. More specifically, in the cured product, the terminal unsaturated functional groups of the curable anisotropic dye and the orientation auxiliary agent are bound to each other to form the crosslinking structure during the curing process, and as a result, the crosslinking copolymer and the dye layer including the same may be formed.

In another example, if the dye layer of the dye-type polarizer is obtained from the composition further including the reactive mesogen and/or the multifunctional binder together with the curable anisotropic dye and the orientation auxiliary agent, the cured product of the dye layer may include a crosslinking copolymer, in which the curable anisotropic dye, the orientation auxiliary agent, optionally, the reactive mesogen and the multifunctional binder having two or more curable unsaturated functional groups are copolymerized to form a crosslinking structure of the curable functional groups of the respective components. Herein, at least a part of the curable anisotropic dye may be oriented. More specifically, in the cured product, the terminal unsaturated functional groups of the curable anisotropic dye and the orientation auxiliary agent, and optionally, the unsaturated groups of the reactive mesogen and the unsaturated functional groups of the multifunctional binder are bound to each other to form the crosslinking structure during the curing process, and as a result, the crosslinking copolymer and the dye layer including the same may be formed.

As revealed above, due to the crosslinking structure in the crosslinking copolymer, orientation of the dye layer and the anisotropic dye may be stabilized without randomization, even though exposed to heat at a high temperature. Therefore, the dye-type polarizer of another embodiment may exhibit excellent degree of polarization and more improved heat resistance to maintain excellent degree of polarization and other physical properties even though exposed to heat at a high temperature.

Meanwhile, in the polarizer, the dye layer may have a dichroic ratio of about 10 or higher, or about 15 or higher. In particular, the polarizer may exhibit more improved orientation and dichroic ratio according to addition of the orientation auxiliary agent or the optional reactive mesogen. In this regard, the dichroic ratio may be defined as the ratio of the absorbance (measured at normal incidence) along the extinction axis and the absorbance along the transmission axis. As the dye layer has excellent orientation of the anisotropic dye and high dichroic ratio, the polarizer may exhibit superior degree of polarization, thereby being properly applied to various fields or use.

In the polarizer, the dye layer may have a thickness of about 10 μm or less, for example, a thickness of about 1 to 5 μm. As the dye layer and the polarizer including the same are as thin as above, the dye-type polarizer may be more properly applied to anti-reflection films for OLEDs, to which application of a stretched PVA film polarizer has been difficult.

The above described curable anisotropic dye may be oriented during a process of manufacturing the polarizer, described in more detail below, and the curable anisotropic dye may be oriented by a typical orientation method that has been previously known, for example, by a rubbing orientation method or a photo-orientation method. Therefore, the polarizer may further include an alignment layer capable of orienting the curable anisotropic dye and optionally the reactive mesogen or the orientation auxiliary agent in the lower portion of the dye layer.

According to a more proper example, a photoalignment layer containing a photoreactive polymer is further formed in the lower portion of the dye layer, and then the photoreactive polymer is photo-oriented, which is used to orient the curable anisotropic dye and optionally the orientation auxiliary agent or the reactive mesogen.

The photoalignment layer may be formed using any photoreactive polymer that has been previously known, for example, a vinyl-based polymer, a norbornene-based polymer or a (meth)acrylate-based polymer having a photoreactive group of a cinnamate group, a chalcone group, an azo group or a coumarin group, without limitation. The curable anisotropic dye may be properly oriented using the photoalignment layer.

In a specific embodiment, however, the photoalignment layer more properly includes a norbornene-based photoreactive polymer which is prepared by binding the norbornene-based repeating unit with one or more photoreactive groups selected from the group consisting of the cinnamate-based photoreactive group, the chalcone-based photoreactive group, the coumarin-based photoreactive group, and the azo-based photoreactive group. The curable anisotropic dye may be more effectively oriented, and thermal stability and mechanical property of the photoalignment layer and the dye-type polarizer including the same may be also improved by applying the photoalignment layer containing the photoreactive polymer.

However, various photoreactive polymers containing the norbornene-based photoreactive polymer, the photoalignment layer including the same, and the production method thereof are already disclosed in Patent Publication No. 2012-0011796, U.S. Pat. Nos. 0,982,394 and 1,307,494, and Patent Publication No. 2012-0031882, and thus additional descriptions thereof will be omitted.

Meanwhile, the dye-type polarizer may be a patterned dye-type polarizer having predetermined patterns, and in this case, the dye layer may have cured product patterns in which a cured product of the composition for forming a dye-type polarizer is selectively formed in a predetermined region, and removed in the other region. As described above, this patterned polarizer may be formed by forming the composition for forming a dye-type polarizer on a substrate, and then, for example, by irradiating a selective region with heat or UV through a mask to selectively cure the corresponding region. Thereafter, the composition is removed from the uncured region so as to easily form a patterned polarizer having desired patterns.

In the patterned polarizer, the cured product pattern may be formed in a line pattern having a predetermined pitch and width, and each pattern included in the cured product patterns may have a cross-sectional aspect ratio of about 0.002 to 1.

Since the above described dye-type polarizer may further include a substrate, it may have a film shape, in which the alignment layer and the dye layer are formed on the substrate. In this regard, as the substrate, a cellulose-based substrate such as TAC, etc., a polyester-based substrate such as PET, etc., an acrylate-based substrate, a cyclic olefin-based substrate such as COP, COC, etc. may be used, and a substrate in the form of an unstretched film may be properly used.

Further, the dye-type polarizer may have high degree of polarization of about 90 or higher and it may also show about 10% or lower, or about 0.1 to 5% reduction in the degree of polarization after heat treatment of about 80° C. for 100 hours, thereby exhibiting excellent heat resistance and a low reduction in the degree of polarization even after heat treatment of the high temperature.

Meanwhile, the above described dye-type polarizer may be manufactured by a method including the steps of forming the composition for forming a dye-type polarizer of an embodiment on the substrate; orienting the curable anisotropic dye and optionally the orientation auxiliary agent or the reactive mesogen; and curing the composition for forming a dye-type polarizer including the oriented anisotropic dye, etc.

That is, as in the above manufacturing method, the polarizer may be easily formed by applying the composition of an embodiment onto a desired substrate, and then orienting the curable anisotropic dye which is a component of the composition, followed by curing.

In the above manufacturing method, the orienting may be performed by the rubbing orientation method or the photo-orientation method according to the typical orientation method, as described above. In a specific embodiment, when the curable anisotropic dye is oriented by the photo-orientation method, a photoalignment layer containing a photoreactive polymer may be additionally formed between the substrate and the thin film of the composition for forming a dye-type polarizer, and then photoreactive polymer may be photo-oriented, which may be used to orient the curable anisotropic dye, etc.

After the orienting step, the curable anisotropic dye and the orientation auxiliary agent, and optionally, the reactive mesogen and/or the multifunctional binder may be cured by heat or photo radiation such as UV light.

By the above described method, a dye-type polarizer may be very easily formed in a thin film-type from the composition of an embodiment.

Meanwhile, the above described dye-type polarizer may be included in various display devices, such as liquid crystal optical films, OLED devices, etc., and also applied to anti-reflection films for OLEDs, smarter shade, etc.

Hereinafter, the preferred Examples are provided for better understanding. However, these Examples are for illustrative purposes only, and the invention is not intended to be limited by these Examples.

As in the following Preparation Examples, curable anisotropic dyes of the following Chemical Formulae 1a to 1f were synthesized and used in Examples. Further, the known non-curable anisotropic dyes of the following Chemical Formulae 1g and 1h were used in Comparative Examples:

[Chemical Formula 1a]

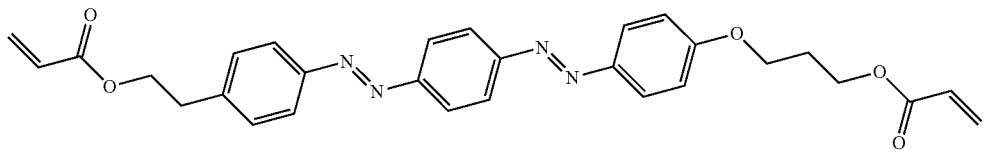

[Chemical Formula 1b]

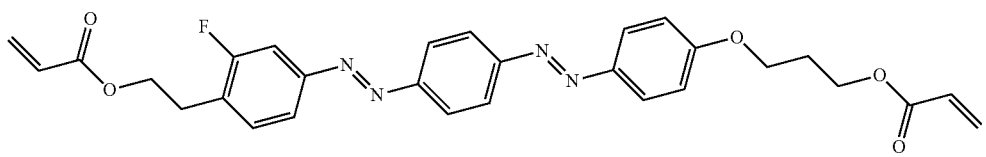

[Chemical Formula 1c]

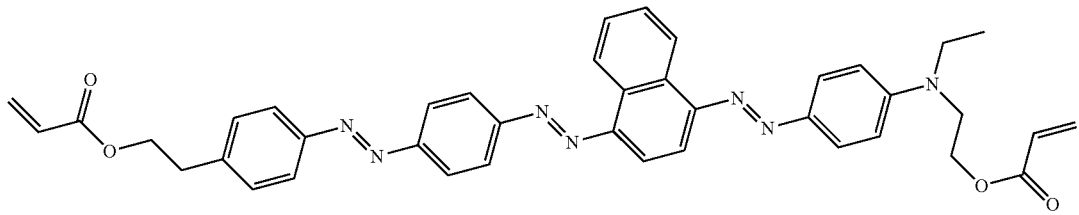

[Chemical Formula 1d]

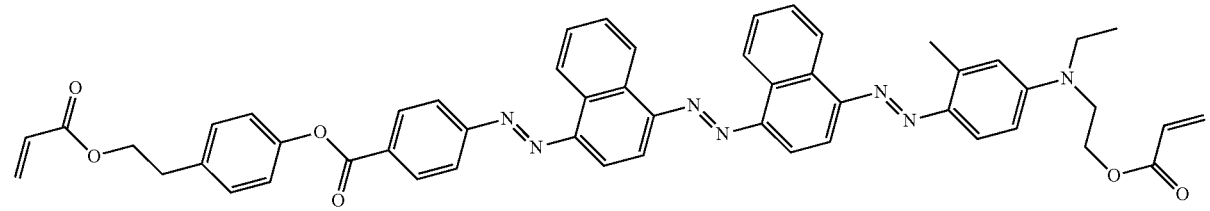

[Chemical Formula 1e]

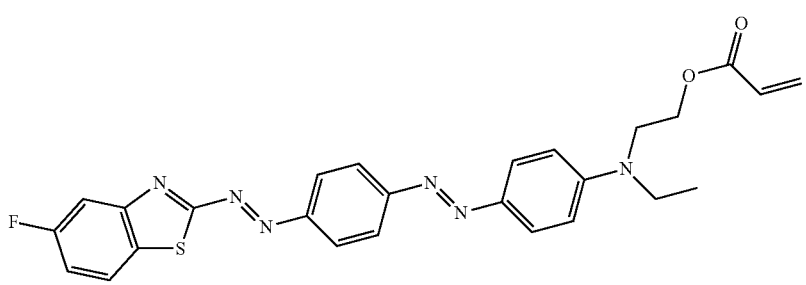

[Chemical Formula 1f]

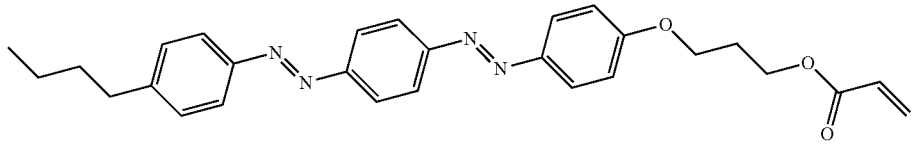

[Chemical Formula 1g]

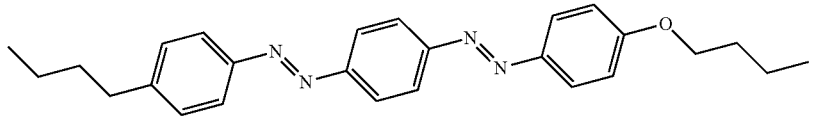

[Chemical Formula 1h]

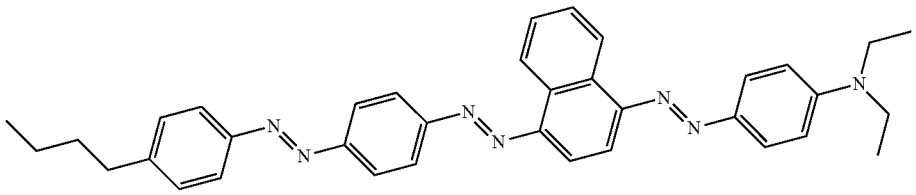

Preparation Example 1

Synthesis of Curable Anisotropic Dye (Chemical Formula 1a)

Formaldehyde (1.2 eq) and sodium bisulfate (1 eg) were added in water and stirred for 1 hour. Aniline (1 eq) was added to this solution, and stirred at 60° C. for 16 hours. After reaction, this solution was cooled to a temperature of 0° C. or lower, so as to precipitate an unpurified product dissolved in the solvent, followed by filtration, washing with ethyl acetate, and drying in a vacuum oven. Consequently, an intermediate product 1 was prepared.

A solution of 4-hydroxyethylaniline (1 eq) in DMF was mixed with sodium nitrite (1.1 eq) dissolved in distilled water, and 1N HCl was slowly added thereto at 0° C., followed by stirring for about 1 hour. The stirred solution was added dropwise to a solution of the intermediate product 1 (1 eq) and sodium acetate (3.5 eq) dissolved in 40 ml of distilled water. At this time, the temperature was maintained at 0° C., and after adding dropwise, stirring was carried out for about 4 hours. After stirring, a solid thus formed was filtered and washed with acetone. After filtration, an intermediate product 2 was obtained.

The intermediate product 2 was added to 1 N NaOH (8eq) solution, followed by stirring at 70° C. for 16 hours. This reaction solution was cooled to room temperature, and then maintained at 0° C. for 30 minutes, followed by filtration. An unpurified product thus filtered was extracted with distilled water and ethyl acetate to obtain an intermediate product 3.

The intermediate product 3 (1 g) was dissolved in propionic acid (60 ml) and DMF (20 ml), and cooled to 0° C. A solution of $NaNO_2$ (1.2 eq) in water (0.5 ml) was added dropwise to this solution, followed by stirring for 1 hour. Then, sulfamic acid (0.5 eq) was added thereto, followed by stirring for 10 minutes. This solution was added dropwise to an ethanol solution, in which hydroxypropoxy benzene (1.5 eq) was dissolved, at 0° C., followed by stirring for 30 minutes and then stirring at room temperature for 16 hours. A saturated $NaHCO_3$ aqueous solution (400 ml) was added to form precipitates, followed by filtration and washing with water. A resultant was dried in a vacuum oven to obtain an intermediate product 4.

The intermediate product 4 was dissolved in DMAc, and cooled to 0° C. Acryloyl chloride (3 eq) was slowly added thereto, followed by stirring at room temperature for 4 hours. A resultant was diluted with diethyl ether, washed with 1N HCl and $NaHCO_3$ aqueous solutions, and extracted with methylene chloride (MC). Column chromatography was performed using MC as an eluent to prepare a compound of Chemical Formula 1a.

NMR (1H, $CDCl_3$): 2.01 (m, 2H), 2.98 (m, 2H), 3.15 (m, 6H), 5.83 (m, 2H), 6.11 (m, 2H), 6.35 (t, 2H), 7.62~8.10 (m, 12H)

Preparation Example 2

Synthesis of Curable Anisotropic Dye (Chemical Formula 1 b)

Formaldehyde (1.2 eq) and sodium bisulfate (1 eg) were added in water and stirred for 1 hour. Aniline (1 eq) was added to this solution, and stirred at 60° C. for 16 hours. After reaction, this solution was cooled to a temperature of 0° C. or lower, so as to precipitate an unpurified product dissolved in the solvent, followed by filtration, washing with ethyl acetate, and drying in a vacuum oven. Consequently, an intermediate product 1 was prepared.

A solution of 4-hydroxyethyl-3-fluoro-aniline (1 eq) in DMF was mixed with sodium nitrite (1.1 eq) dissolved in distilled water, and 1N HCl was slowly added thereto at 0° C., followed by stirring for about 1 hour. The stirred solution was added dropwise to a solution of the intermediate product 1 (1 eq) and sodium acetate (3.5 eq) dissolved in 40 ml of distilled water. At this time, the temperature was maintained at 0° C., and after adding dropwise, stirring was carried out for about 4 hours. After stirring, a solid thus formed was filtered and washed with acetone. After filtration, an intermediate product 2 was obtained.

The intermediate product 2 was added to 1 N NaOH (8eq) solution, followed by stirring at 70° C. for 16 hours. This reaction solution was cooled to room temperature, and then maintained at 0° C. for 30 minutes, followed by filtration. An unpurified product thus filtered was extracted with distilled water and ethyl acetate to obtain an intermediate product 3.

The intermediate product 3 (1 g) was dissolved in propionic acid (60 ml) and DMF (20 ml), and cooled to 0° C. A solution of $NaNO_2$ (1.2 eq) in water (0.5 ml) was added dropwise to this solution, followed by stirring for 1 hour. Then, sulfamic acid (0.5 eq) was added thereto, followed by stirring for 10 minutes. This solution was added dropwise to an ethanol solution, in which hydroxypropoxy benzene (1.5 eq) was dissolved, at 0° C., followed by stirring for 30 minutes and then stirring at room temperature for 16 hours. A saturated $NaHCO_3$ aqueous solution (400 ml) was added to form precipitates, followed by filtration and washing with water. A resultant was dried in a vacuum oven to obtain an intermediate product 4.

The intermediate product 4 was dissolved in DMAc, and cooled to 0° C. Acryloyl chloride (3 eq) was slowly added thereto, followed by stirring at room temperature for 4 hours. A resultant was diluted with diethyl ether, washed with 1N HCl and $NaHCO_3$ aqueous solutions, and extracted with methylene chloride (MC). Column chromatography was performed using MC as an eluent to prepare a compound of Chemical Formula 1 b.

NMR (1H, $CDCl_3$): 2.01 (m, 2H), 3.02~3.18 (m, 2H), 5.83 (m, 2H), 6.11 (m, 2H), 6.35 (t, 2H), 7.62~8.18 (m, 11H)

Preparation Example 3

Synthesis of Curable Anisotropic Dye (Chemical Formula 1c)

Formaldehyde (1.2 eq) and sodium bisulfate (1 eg) were added in water and stirred for 1 hour. Aniline (1 eq) was added to this solution, and stirred at 60° C. for 16 hours. After reaction, this solution was cooled to a temperature of 0° C. or lower, so as to precipitate an unpurified product dissolved in the solvent, followed by filtration, washing with ethyl acetate, and drying in a vacuum oven. Consequently, an intermediate product 1 was prepared.

A solution of 4-hydroxyethylaniline (1 eq) in DMF was mixed with sodium nitrite (1.1 eq) dissolved in distilled water, and 1N HCl was slowly added thereto at 0° C., followed by stirring for about 1 hour. The stirred solution was added dropwise to a solution of the intermediate product 1 (1 eq) and sodium acetate (3.5 eq) dissolved in 40 ml of distilled water. At this time, the temperature was maintained at 0° C., and after adding dropwise, stirring was carried out for about 4 hours. After stirring, a solid thus formed was filtered and washed with acetone. After filtration, an intermediate product 2 was obtained.

The intermediate product 2 was added to 1 N NaOH (8eq) solution, followed by stirring at 70° C. for 16 hours. This reaction solution was cooled to room temperature, and then maintained at 0° C. for 30 minutes, followed by filtration. An unpurified product thus filtered was extracted with distilled water and ethyl acetate to obtain an intermediate product 3.

The intermediate product 3 (1 g) and $NaNO_2$ (1.2 eq) were dissolved in DMF/water (80/20(v/v)), and cooled to 0° C. A sulfuric acid (4.2 ml) solution was added dropwise to this solution, followed by stirring for 1 hour. Then, sulfamic acid (0.3 eq) was added thereto, followed by stirring for 10 minutes. This solution was added dropwise to an ethanol solution (130 ml), in which 1-naphthylamine (1 eq) and saturated NaOAc (21 ml) were dissolved, at 0° C., followed by stirring for 30 minutes. A saturated $NaHCO_3$ aqueous solution (84 ml) was added thereto, followed by stirring for 16 hours. Water (800 ml) was added to form precipitates, followed by filtration and washing with water. A solid thus obtained was dried in a vacuum oven to obtain an intermediate product 4.

The intermediate product 4 (1 g) was dissolved in propionic acid (60 ml) and DMF (20 ml), and cooled to 0° C. A solution of $NaNO_2$ (1.2 eq) in water (0.5 ml) was added dropwise to this solution, followed by stirring for 1 hour. Then, sulfamic acid (0.5 eq) was added thereto, followed by stirring for 10 minutes. This solution was added dropwise to an ethanol solution, in which N-phenyl-N-ethyl-ethanolamine (1.5 eq) was dissolved, at 0° C., followed by stirring for 30 minutes and then stirring at room temperature for 16 hours. A saturated $NaHCO_3$ aqueous solution (400 ml) was added to form precipitates, followed by filtration and washing with water. A resultant was dried in a vacuum oven to obtain an intermediate product 5.

The intermediate product 5 was dissolved in DMAc, and cooled to 0° C. Acryloyl chloride (3 eq) was slowly added thereto, followed by stirring at room temperature for 4 hours. A resultant was diluted with diethyl ether, washed with 1N HCl and $NaHCO_3$ aqueous solutions, and extracted with methylene chloride (MC). Column chromatography was performed using MC as an eluent to prepare a compound of Chemical Formula 1c.

NMR (1H, $CDCl_3$): 1.3 (q, 5H), 1.48 (s, 4H), 3.05 (d, 2), 3.55 (d, 2), 3.81 (d, 2), 4.43 (m, 4H), 5.87 (m, 2H), 6.15 (m, 2H), 6.43 (t, 2H), 6.90 (d, 2H), 7.31 (s, 2H), 7.44 (d, 2H), 7.73~8.24 (m, 14H), 9.04 (dd, 2H)

Preparation Example 4

Synthesis of Curable Anisotropic Dye (Chemical Formula 1d)

A compound of Chemical Formula 1d was synthesized in the same manner as in Preparation Example 3, except that 1-naphthylamine was used instead of aniline upon synthesis of the intermediate product 1, 4-hydroxyethyl benzoate aniline was used instead of 4-hydroxyethylaniline upon synthesis of the intermediate product 2, and N-(3-methylphenyl)-N-ethyl-ethanolamine was used instead of N-phenyl-N-ethyl-ethanolamine upon synthesis of the intermediate product 5.

NMR (1H, $CDCl_3$): 1.22 (q, 5H), 1.45 (s, 4H), 3.10 (d, 2), 3.57 (d, 2), 3.86 (d, 2), 4.43 (m, 4H), 4.8 (s, 3H), 5.87 (m, 2H), 6.18 (m, 2H), 6.49 (t, 2H), 6.92 (d, 2H), 7.22 (s, 2H), 7.44 (d, 2H), 7.65~8.29 (m, 20H), 9.08 (dd, 2H)

Preparation Example 5

Synthesis of Curable Anisotropic Dye (Chemical Formula 1e)

A compound of Chemical Formula 1e was synthesized in the same manner as in Preparation Example 1, except that 2-amino-6-fluorobenzothiazole was used instead of 4-hydroxyethylaniline upon synthesis of the intermediate product 2, and N-phenyl-N-ethyl-ethanolamine was used instead of hydroxypropoxy benzene upon synthesis of the intermediate product 4.

NMR (1H, $CDCl_3$): 3.13 (d, 2H), 3.81 (d, 2H), 4.46 (m, 4H), 4.75 (s, 3H), 5.80 (m, 2H), 6.16 (m, 1H), 6.44 (t, 1H), 6.90 (m, 2H), 7.30~8.29 (m, 10H), 9.05 (dd, 2H)

Preparation Example 6

Synthesis of Curable Anisotropic Dye (Chemical Formula 1f)

A compound of Chemical Formula 1f was synthesized in the same manner as in Preparation Example 1, except that 4-propyl aniline was used instead of 4-hydroxyethylaniline upon synthesis of the intermediate product 2.

NMR (1H, $CDCl_3$): 0.98 (t, 3H), 1.53 (m, 2H), 2.01 (m, 2H), 2.49 (t, 2H), 2.98 (m, 2H), 3.15 (m, 6H), 5.83 (m, 2H), 6.11 (m, 2H), 6.35 (t, 2H), 7.62~8.10 (m, 12H)

The known compounds of the following Chemical Formulae 2a to 3f or radical polymers thereof were commercially purchased and used as orientation auxiliary agents in the following Examples and Comparative Examples:

[Chemical Formula 2a]

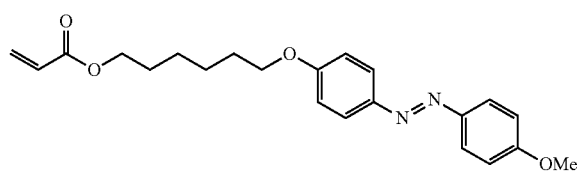

-continued

[Chemical Formula 2b]

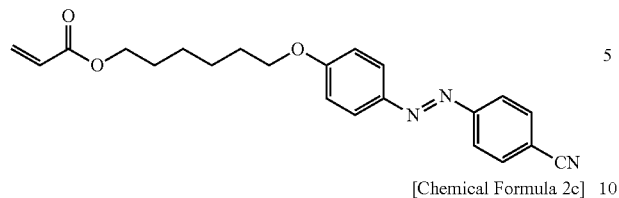

[Chemical Formula 2c]

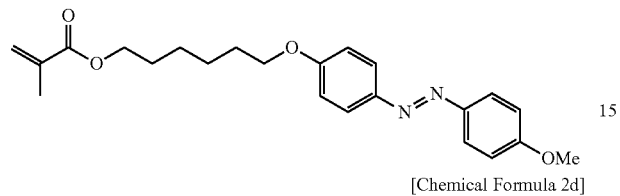

[Chemical Formula 2d]

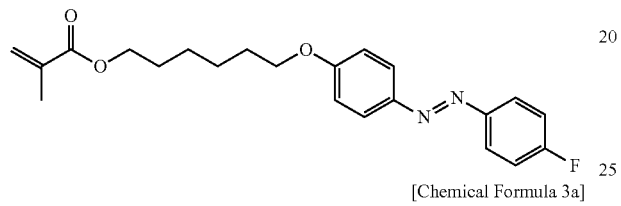

[Chemical Formula 3a]

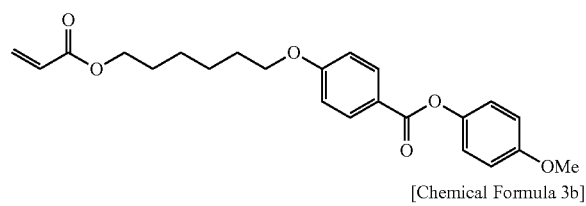

[Chemical Formula 3b]

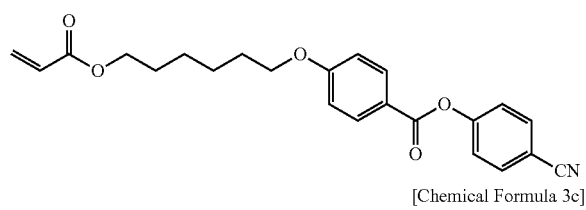

[Chemical Formula 3c]

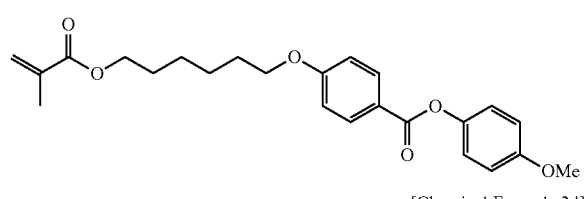

[Chemical Formula 3d]

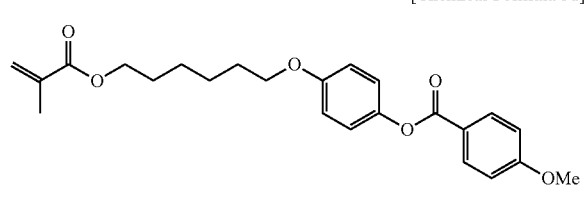

[Chemical Formula 3e]

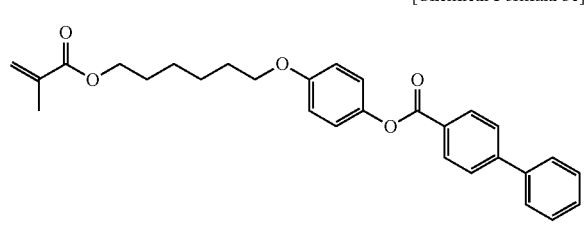

-continued

[Chemical Formula 3f]

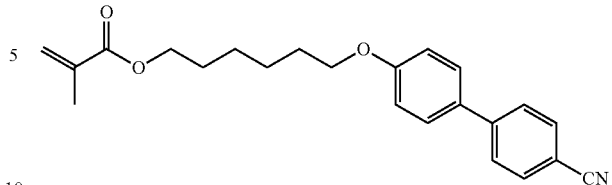

Example 1

Manufacture of Dye-Type Polarizer

Poly (cinnamate-norbornene) in dissolved in cyclopentanone was bar-coated on a COP substrate, and dried at 80° C. Polarized UV of 30 mJ was radiated thereto to form a photoalignment layer. The compound of Chemical Formula 1a (curable anisotropic dye; concentration in solution: 2% by weight), the compound of Chemical Formula 2a (orientation auxiliary agent; concentration in solution: 15% by weight), and Irgacure 907 (concentration in solution: 0.7% by weight) dissolved in cyclopentanone were bar-coated on the photoalignment layer thus formed. Thereafter, the layer was dried at 60° C. for 2 minutes and cured by UV irradiation of 50 mJ/cm$^2$ to manufacture a dye-type polarizer.

Example 2

Manufacture of Dye-Type Polarizer

A dye-type polarizer was manufactured in the same manner as in Example 1, except that the compound of Chemical Formula 1a (curable anisotropic dye; concentration in solution: 2% by weight), a radical polymer of the compound of Chemical Formula 2c (orientation auxiliary agent; Mw: 8000; concentration in solution: 15% by weight), and Irgacure 907 (concentration in solution: 0.7% by weight) were used.

Example 3

Manufacture of Dye-Type Polarizer

A dye-type polarizer was manufactured in the same manner as in Example 1, except that the compound of Chemical Formula 1 b (curable anisotropic dye; concentration in solution: 2% by weight), the compound of Chemical Formula 2a (orientation auxiliary agent; concentration in solution: 15% by weight), and Irgacure 907 (concentration in solution: 0.7% by weight) were used.

Example 4

Manufacture of Dye-Type Polarizer

A dye-type polarizer was manufactured in the same manner as in Example 1, except that the compound of Chemical Formula 1c (curable anisotropic dye; concentration in solution: 2% by weight), the compound of Chemical Formula 2a (orientation auxiliary agent; concentration in solution: 15% by weight), and Irgacure 907 (concentration in solution: 0.7% by weight) were used.

Example 5

Manufacture of Dye-Type Polarizer

A dye-type polarizer was manufactured in the same manner as in Example 1, except that the compound of Chemical Formula 1c (curable anisotropic dye; concentration in solution: 2% by weight), the compound of Chemical Formula 2b (orientation auxiliary agent; concentration in solution: 15% by weight), and Irgacure 907 (concentration in solution: 0.7% by weight) were used.

Example 6

Manufacture of Dye-Type Polarizer

A dye-type polarizer was manufactured in the same manner as in Example 1, except that the compound of Chemical Formula 1c (curable anisotropic dye; concentration in solution: 2% by weight), a radical polymer of the compound of Chemical Formula 2c (orientation auxiliary agent; Mw: 8000; concentration in solution: 15% by weight), and Irgacure 907 (concentration in solution: 0.7% by weight) were used.

Example 7

Manufacture of Dye-Type Polarizer

A dye-type polarizer was manufactured in the same manner as in Example 1, except that the compound of Chemical Formula 1c (curable anisotropic dye; concentration in solution: 2% by weight), a radical polymer of the compound of Chemical Formula 2d (orientation auxiliary agent; Mw: 8000; concentration in solution: 15% by weight), and Irgacure 907 (concentration in solution: 0.7% by weight) were used.

Example 8

Manufacture of Dye-Type Polarizer

A dye-type polarizer was manufactured in the same manner as in Example 1, except that the compound of Chemical Formula 1c (curable anisotropic dye; concentration in solution: 2% by weight), the compound of Chemical Formula 3a (orientation auxiliary agent; concentration in solution: 15% by weight), and Irgacure 907 (concentration in solution: 0.7% by weight) were used.

Example 9

Manufacture of Dye-Type Polarizer

A dye-type polarizer was manufactured in the same manner as in Example 1, except that the compound of Chemical Formula 1c (curable anisotropic dye; concentration in solution: 2% by weight), a radical polymer of the compound of Chemical Formula 3c (orientation auxiliary agent; Mw: 10000; concentration in solution: 15% by weight), and Irgacure 907 (concentration in solution: 0.7% by weight) were used.

Example 10

Manufacture of Dye-Type Polarizer

A dye-type polarizer was manufactured in the same manner as in Example 1, except that the compound of Chemical Formula 1c (curable anisotropic dye; concentration in solution: 2% by weight), a radical polymer of the compound of Chemical Formula 3d (orientation auxiliary agent; Mw: 8000; concentration in solution: 15% by weight), and Irgacure 907 (concentration in solution: 0.7% by weight) were used.

Example 11

Manufacture of Dye-Type Polarizer

A dye-type polarizer was manufactured in the same manner as in Example 1, except that the compound of Chemical Formula 1c (curable anisotropic dye; concentration in solution: 2% by weight), a radical polymer of the compound of Chemical Formula 3e (orientation auxiliary agent; Mw: 6000; concentration in solution: 15% by weight), and Irgacure 907 (concentration in solution: 0.7% by weight) were used.

Example 12

Manufacture of Dye-Type Polarizer

A dye-type polarizer was manufactured in the same manner as in Example 1, except that the compound of Chemical Formula 1 d (curable anisotropic dye; concentration in solution: 2% by weight), a radical polymer of the compound of Chemical Formula 2c (orientation auxiliary agent; Mw: 8000; concentration in solution: 15% by weight), and Irgacure 907 (concentration in solution: 0.7% by weight) were used.

Example 13

Manufacture of Dye-Type Polarizer

A dye-type polarizer was manufactured in the same manner as in Example 1, except that the compound of Chemical Formula 1e (curable anisotropic dye; concentration in solution: 2% by weight), a radical polymer of the compound of Chemical Formula 2c (orientation auxiliary agent; Mw: 8000; concentration in solution: 15% by weight), and Irgacure 907 (concentration in solution: 0.7% by weight) were used.

Example 14

Manufacture of Dye-Type Polarizer

A dye-type polarizer was manufactured in the same manner as in Example 1, except that the compound of Chemical Formula 1 f (curable anisotropic dye; concentration in solution: 2% by weight), a radical polymer of the compound of Chemical Formula 2c (orientation auxiliary agent; Mw: 8000; concentration in solution: 15% by weight), and Irgacure 907 (concentration in solution: 0.7% by weight) were used.

Example 15

Manufacture of Dye-Type Polarizer

A dye-type polarizer was manufactured in the same manner as in Example 1, except that the compound of Chemical Formula 1a (curable anisotropic dye; concentration in solution: 2% by weight), the compound of Chemical Formula 2a (orientation auxiliary agent; concentration in solution: 15% by weight), reactive mesogen RM257 manufactured by MERCK (concentration in solution: 5% by weight), and Irgacure 907 (concentration in solution: 1% by weight) were used.

Example 16

Manufacture of Dye-Type Polarizer

A dye-type polarizer was manufactured in the same manner as in Example 1, except that the compound of Chemical Formula 1a (curable anisotropic dye; concentration in solution: 2% by weight), a radical polymer of the compound of Chemical Formula 2c (orientation auxiliary agent; Mw: 8000; concentration in solution: 15% by weight), RM257 (concentration in solution: 5% by weight), and Irgacure 907 (concentration in solution: 1% by weight) were used.

Example 17

Manufacture of Dye-Type Polarizer

A dye-type polarizer was manufactured in the same manner as in Example 1, except that the compound of Chemical Formula 1 b (curable anisotropic dye; concentration in solution: 2% by weight), the compound of Chemical Formula 2a (orientation auxiliary agent; concentration in solution: 15% by weight), RM257 (concentration in solution: 5% by weight), and Irgacure 907 (concentration in solution: 1% by weight) were used.

Example 18

Manufacture of Dye-Type Polarizer

A dye-type polarizer was manufactured in the same manner as in Example 1, except that the compound of Chemical Formula 1c (curable anisotropic dye; concentration in solution: 2% by weight), the compound of Chemical Formula 2a (orientation auxiliary agent; concentration in solution: 15% by weight), RM257 (concentration in solution: 5% by weight), and Irgacure 907 (concentration in solution: 1% by weight) were used.

Example 19

Manufacture of Dye-Type Polarizer

A dye-type polarizer was manufactured in the same manner as in Example 1, except that the compound of Chemical Formula 1c (curable anisotropic dye; concentration in solution: 2% by weight), the compound of Chemical Formula 2b (orientation auxiliary agent; concentration in solution: 15% by weight), RM257 (concentration in solution: 5% by weight), and Irgacure 907 (concentration in solution: 1% by weight) were used.

Example 20

Manufacture of Dye-Type Polarizer

A dye-type polarizer was manufactured in the same manner as in Example 1, except that the compound of Chemical Formula 1c (curable anisotropic dye; concentration in solution: 2% by weight), a radical polymer of the compound of Chemical Formula 2c (orientation auxiliary agent; Mw: 8000; concentration in solution: 15% by weight), RM257 (concentration in solution: 5% by weight), and Irgacure 907 (concentration in solution: 1% by weight) were used.

Example 21

Manufacture of Dye-Type Polarizer

A dye-type polarizer was manufactured in the same manner as in Example 1, except that the compound of Chemical Formula 1c (curable anisotropic dye; concentration in solution: 2% by weight), a radical polymer of the compound of Chemical Formula 2d (orientation auxiliary agent; Mw: 7000; concentration in solution: 15% by weight), RM257 (concentration in solution: 5% by weight), and Irgacure 907 (concentration in solution: 1% by weight) were used.

Example 22

Manufacture of Dye-Type Polarizer

A dye-type polarizer was manufactured in the same manner as in Example 1, except that the compound of Chemical Formula 1c (curable anisotropic dye; concentration in solution: 2% by weight), the compound of Chemical Formula 3a (orientation auxiliary agent; concentration in solution: 15% by weight), RM257 (concentration in solution: 5% by weight), and Irgacure 907 (concentration in solution: 1% by weight) were used.

Example 23

Manufacture of Dye-Type Polarizer

A dye-type polarizer was manufactured in the same manner as in Example 1, except that the compound of Chemical Formula 1c (curable anisotropic dye; concentration in solution: 2% by weight), a radical polymer of the compound of Chemical Formula 3c (orientation auxiliary agent; Mw: 10000; concentration in solution: 15% by weight), and Irgacure 907 (concentration in solution: 1% by weight) were used.

Example 24

Manufacture of Dye-Type Polarizer

A dye-type polarizer was manufactured in the same manner as in Example 1, except that the compound of Chemical Formula 1c (curable anisotropic dye; concentration in solution: 2% by weight), a radical polymer of the compound of Chemical Formula 3d (orientation auxiliary agent; Mw: 8000; concentration in solution: 15% by weight), RM257 (concentration in solution: 5% by weight), and Irgacure 907 (concentration in solution: 1% by weight) were used.

Example 25

Manufacture of Dye-Type Polarizer

A dye-type polarizer was manufactured in the same manner as in Example 1, except that the compound of Chemical Formula 1c (curable anisotropic dye; concentration in solution: 2% by weight), a radical polymer of the compound of Chemical Formula 3e (orientation auxiliary agent; Mw: 6000; concentration in solution: 15% by weight), and Irgacure 907 (concentration in solution: 1% by weight) were used.

Example 26

Manufacture of Dye-Type Polarizer

A dye-type polarizer was manufactured in the same manner as in Example 1, except that the compound of Chemical Formula 1 d (curable anisotropic dye; concentration in solution: 2% by weight), a radical polymer of the compound of Chemical Formula 2c (orientation auxiliary agent; Mw: 8000; concentration in solution: 15% by weight), and Irgacure 907 (concentration in solution: 1% by weight) were used.

Example 27

Manufacture of Dye-Type Polarizer

A dye-type polarizer was manufactured in the same manner as in Example 1, except that the compound of Chemical Formula 1e (curable anisotropic dye; concentration in solution: 2% by weight), a radical polymer of the compound of Chemical Formula 2c (orientation auxiliary agent; Mw: 8000; concentration in solution: 15% by weight), RM257 (concentration in solution: 5% by weight), and Irgacure 907 (concentration in solution: 1% by weight) were used.

Example 28

Manufacture of Dye-Type Polarizer

A dye-type polarizer was manufactured in the same manner as in Example 1, except that the compound of Chemical Formula 1 f (curable anisotropic dye; concentration in solution: 2% by weight), a radical polymer of the compound of Chemical Formula 2c (orientation auxiliary agent; Mw: 8000; concentration in solution: 15% by weight), and Irgacure 907 (concentration in solution: 1% by weight) were used.

Comparative Example 1

Manufacture of Dye-Type Polarizer

A dye-type polarizer was manufactured in the same manner as in Example 1, except that the compound of Chemical Formula 1 g (the known non-curable anisotropic dye; concentration in solution: 2% by weight), a radical polymer of the compound of Chemical Formula 2c (orientation auxiliary agent; Mw: 8000; concentration in solution: 15% by weight), and Irgacure 907 (concentration in solution: 0.7% by weight) were used.

Comparative Example 2

Manufacture of Dye-Type Polarizer

A dye-type polarizer was manufactured in the same manner as in Example 1, except that the compound of Chemical Formula 1 h (the known non-curable anisotropic dye; concentration in solution: 2% by weight), a radical polymer of the compound of Chemical Formula 2c (orientation auxiliary agent; Mw: 8000; concentration in solution: 15% by weight), and Irgacure 907 (concentration in solution: 0.7% by weight) were used.

Comparative Example 3

Manufacture of Dye-Type Polarizer

A dye-type polarizer was manufactured in the same manner as in Example 1, except that the compound of Chemical Formula 1g (the known non-curable anisotropic dye; concentration in solution: 2% by weight), a radical polymer of the compound of Chemical Formula 2c (orientation auxiliary agent; Mw: 8000; concentration in solution: 15% by weight) and Irgacure 907 (concentration in solution: 1% by weight) were used.

Comparative Example 4

Manufacture of Dye-Type Polarizer

A dye-type polarizer was manufactured in the same manner as in Example 1, except that the compound of Chemical Formula 1 h (the known non-curable anisotropic dye; concentration in solution: 2% by weight), a radical polymer of the compound of Chemical Formula 2c (orientation auxiliary agent; Mw: 8000; concentration in solution: 15% by weight) and Irgacure 907 (concentration in solution: 1% by weight) were used.

Comparative Example 5

Manufacture of Dye-Type Polarizer

A dye-type polarizer was manufactured in the same manner as in Example 1, except that the compound of Chemical Formula 1a (curable anisotropic dye; concentration in solution: 2% by weight) and Irgacure 907 (concentration in solution: 0.7% by weight) were used without using the orientation auxiliary agent in the composition of Example 1.

Comparative Example 6

Manufacture of Dye-Type Polarizer

A dye-type polarizer was manufactured in the same manner as in Example 15, except that the compound of Chemical Formula 1a (curable anisotropic dye; concentration in solution: 2% by weight), RM257 (concentration in solution: 5% by weight), and Irgacure 907 (concentration in solution: 1% by weight) were used without using the orientation auxiliary agent in the composition of Example 15.

Experimental Example 1

Evaluation of Dichroic Ratio (DR) and Heat Resistance of Dye-Type Polarizer

The dichroic ratio (an average of the values measured at wavelengths of 380 to 780 nm) was measured using a Jasco polarimeter, and for evaluation of heat resistance, heat-treatment was performed in an oven at 80° C. for 100 hours, and the dichroic ratios before and after heat treatment were compared to evaluate a reduction rate of dichroic ratio. The results are summarized in Table 1 below.

TABLE 1

| | Dichroic ratio | Dichroic ratio after heat treatment at 80° C. for 100 hrs | Reduction rate of dichroic ratio (%) |
|---|---|---|---|
| Example 1 | 9.2 | 8.5 | 7.6 |
| Example 2 | 11.8 | 10.9 | 7.6 |
| Example 3 | 8.4 | 8.0 | 4.8 |
| Example 4 | 13.9 | 13.8 | 0.7 |
| Example 5 | 13.5 | 13.1 | 3.0 |
| Example 6 | 15.1 | 14.6 | 3.3 |
| Example 7 | 14.9 | 14.5 | 2.7 |
| Example 8 | 9.6 | 9.4 | 2.1 |
| Example 9 | 14.1 | 13.2 | 6.4 |
| Example 10 | 14.6 | 14.3 | 2.0 |
| Example 11 | 15.1 | 14.2 | 6.0 |
| Example 12 | 13.8 | 13.4 | 2.9 |
| Example 13 | 7.7 | 7.1 | 7.8 |
| Example 14 | 9.8 | 9.7 | 1.0 |
| Example 15 | 9.4 | 9.2 | 2.1 |
| Example 16 | 11.5 | 11.6 | 0 |
| Example 17 | 7.5 | 7.3 | 2.7 |
| Example 18 | 13.5 | 13.5 | 0 |
| Example 19 | 13.0 | 12.8 | 1.5 |
| Example 20 | 14.1 | 14.2 | 0 |
| Example 21 | 15.0 | 14.6 | 2.7 |
| Example 22 | 9.0 | 9.2 | 0 |
| Example 23 | 14.5 | 14.4 | 0.7 |
| Example 24 | 14.0 | 14.0 | 0 |
| Example 25 | 15.0 | 14.7 | 0.7 |
| Example 26 | 13.2 | 13.1 | 0.8 |
| Example 27 | 9.5 | 9.4 | 1.0 |
| Example 28 | 9.4 | 9.5 | 0 |
| Comparative Example 1 | 8.2 | 3.7 | 54.9 |
| Comparative Example 2 | 7.4 | 3.2 | 56.8 |
| Comparative Example 3 | 8.5 | 5.6 | 34.1 |
| Comparative Example 4 | 7.6 | 5.8 | 23.7 |
| Comparative Example 5 | 8.5 | 4.7 | 44.7 |
| Comparative Example 6 | 6.1 | 3.5 | 42.6 |

Referring to Table 1, the dye-type polarizers of Examples showed superior dichroic ratio. Thus, the polarizers have excellent properties as polarizers, and also excellent heat resistance and durability by minimizing reductions in the dichroic ratio after heat treatment and reductions in the degree of polarization.

The invention claimed is:

1. A composition for forming a dye-type polarizer, comprising:
   a curable anisotropic dye of the following Chemical Formula 1; and
   an orientation auxiliary agent of the following Chemical Formula 2 or a radical polymer thereof,
   wherein a weight ratio between the curable anisotropic dye and the orientation auxiliary agent is 1:95 to 25:50, and
   wherein the curable anisotropic dye and the orientation auxiliary agent forms a crosslinking structure in the dye-type polarizer,
   wherein the dye-type polarizer comprising a dye layer including a cured product of the composition for forming a dye-type polarizer, wherein the dye layer has a dichroic ratio of 10 or higher, and a degree of polarization of the dye-type polarizer is 90 or higher, and a reduction rate of degree of polarization after heat treatment at 80° C. for 48 hours is 10% or less:

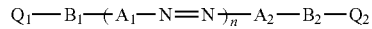

[Chemical Formula 1]

wherein n is an integer of 2 to 5, in which two or more of a repeating unit of —($A_1$-N═N)— are the same as or different from each other, respectively,
at least one of $Q_1$ and $Q_2$ is a curable unsaturated functional group, and the other is hydrogen, alkyl having 1 to 20 carbon atoms, alkoxy having 1 to 20 carbon atoms, alkylester having 1 to 20 carbon atoms, or amine,
$A_1$ and $A_2$ are the same as or different from each other, and are substituted or unsubstituted arylene having 6 to 40 carbon atoms, or substituted or unsubstituted heteroarylene having 4 to 30 carbon atoms,
$B_1$ and $B_2$ are the same as or different from each other, and are a divalent functional group in a combination of one or more selected from the group consisting of a single bond, —(C═O)O—, —O(C═O)—, substituted or unsubstituted alkylene having 1 to 20 carbon atoms, substituted or unsubstituted arylene having 6 to 40 carbon atoms, substituted or unsubstituted heteroarylene having 4 to 30 carbon atoms, substituted or unsubstituted alkyleneoxide having 1 to 20 carbon atoms, —O—, —S—, —$NR_1$— and —$PR_1$—, and
$R_1$ is hydrogen or alkyl having 1 to 20 carbon atoms,

[Chemical Formula 2]

wherein at least one of $Q_3$ and $Q_4$ is a curable unsaturated functional group, and the other is hydrogen, alkyl having 1 to 20 carbon atoms, alkoxy having 1 to 20 carbon atoms, alkylester having 1 to 20 carbon atoms, —CN, —$NO_2$, halogen, or amine unsubstituted or substituted with 1 or 2 of alkyl having 1 to 6 carbon atoms,
$A_3$ and $A_4$ are the same as or different from each other, and are substituted or unsubstituted arylene having 6 to 40 carbon atoms, or substituted or unsubstituted heteroarylene having 4 to 30 carbon atoms,
$B_3$ and $B_4$ are the same as or different from each other, and are a divalent functional group in a combination of one or more selected from the group consisting of a single bond, —(C═O)O—, —O(C═O)—, substituted or unsubstituted alkylene having 1 to 20 carbon atoms, substituted or unsubstituted arylene having 6 to 40 carbon atoms, substituted or unsubstituted heteroarylene having 4 to 30 carbon atoms, substituted or unsubstituted alkyleneoxide having 1 to 20 carbon atoms, —O—, —S—, —$NR_2$— and —$PR_2$—, and
$R_2$ is hydrogen or alkyl having 1 to 20 carbon atoms.

2. The composition of claim 1, wherein the unsaturated functional groups of $Q_1$ to $Q_4$ are each independently curable unsaturated functional groups having a (meth)acrylate group, an epoxy group, or a vinyl group at their ends.

3. The composition of claim 1, wherein the groups other than the unsaturated functional groups in $Q_1$ to $Q_4$ are each independently hydrogen, alkyl having 1 to 20 carbon atoms, aryl having 6 to 40 carbon atoms, alkoxy having 1 to 20 carbon atoms, alkylester having 1 to 20 carbon atoms, —CN, halogen, or amine substituted or unsubstituted with 1 or 2 of alkyl having 1 to 6 carbon atoms.

4. The composition of claim 1, wherein $A_1$ to $A_4$ are each independently arylene having 6 to 40 carbon atoms, which is unsubstituted or substituted with alkoxy having 1 to 20 carbon atoms, alkyl having 1 to 20 carbon atoms, halogen, —$NO_2$ or alkylester having 1 to 6 carbon atoms.

5. The composition of claim 1, wherein $B_1$ to $B_4$ are each independently a divalent functional group selected from the group consisting of a single bond, —(C=O)O—, —O(C=O)—, alkylene having 1 to 20 carbon atoms, arylene having 6 to 40 carbon atoms, alkyleneoxide having 1 to 20 carbon atoms, —O-(alkylene having 1 to 20 carbon atoms)-, and an amine group which is unsubstituted or substituted with alkyl having 1 to 6 carbon atoms.

6. The composition of claim 1, further comprising a reactive mesogen.

7. The composition of claim 6, wherein the reactive mesogen comprises a compound of the following Chemical Formula 4:

[Chemical Formula 4]

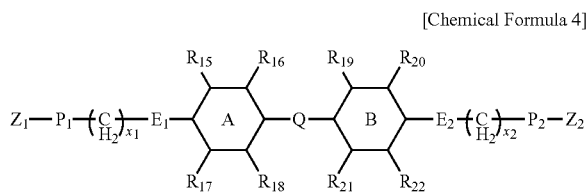

wherein A and B are each independently arylene having 6 to 40 carbon atoms, or cycloalkylene having 6 to 12 carbon atoms, $R_{15}$ to $R_{22}$ are each independently selected from the group consisting of hydrogen, halogen, —CN, alkyl having 1 to 12 carbon atoms, aryl having 6 to 40 carbon atoms, alkoxy having 1 to 12 carbon atoms, and alkoxycarbonyl having 1 to 12 carbon atoms, $E_1$ and $E_2$ are each independently a single bond, —O—, —S—, —CO—, —COO—, —OCO—, —CH=CH—COO—, —OCO—CH=CH—, —C≡C—, —$OCH_2$— or —$CH_2O$—, $Z_1$ and $Z_2$ are each independently a (meth)acrylate group, $P_1$, $P_2$ and Q are each independently the same as in A, $E_1$ or $Z_1$, and $x_1$ and $x_2$ are each independently an integer of 0 to 12.

8. The composition of claim 6, comprising 1 to 25 parts by weight of the curable anisotropic dye, 50 to 95 parts by weight of the orientation auxiliary agent, and 1 to 45 parts by weight of the reactive mesogen, based on 100 parts by weight of the solid content of the total composition.

9. A dye-type polarizer comprising a dye layer including a cured product of the composition for forming a dye-type polarizer of claim 1.

10. The dye-type polarizer of claim 9, wherein the cured product comprises a crosslinking copolymer having a crosslinking structure of the curable unsaturated functional groups of the curable anisotropic dye and the orientation auxiliary agent resulting from copolymerization of the components, and at least a part of the curable anisotropic dye is oriented.

11. The dye-type polarizer of claim 9, wherein the cured product comprises a crosslinking copolymer having a crosslinking structure of the curable functional groups of the curable anisotropic dye, the orientation auxiliary agent, and the reactive mesogen resulting from copolymerization of the components, and at least a part of the curable anisotropic dye is oriented.

12. The dye-type polarizer of claim 9, wherein the dye layer has a thickness of 1 to 10 μm.

13. The dye-type polarizer of claim 9, further comprising an alignment layer capable of orienting the curable anisotropic dye in the lower portion of the dye layer.

14. The dye-type polarizer of claim 13, wherein the alignment layer comprises a norbornene-based photoreactive polymer which is prepared by binding a norbornene-based repeating unit with one or more photoreactive groups selected from the group consisting of a cinnamate-based photoreactive group, a chalcone-based photoreactive group, a coumarin-based photoreactive group, and an azo-based photoreactive group.

15. The dye-type polarizer of claim 9, wherein the dye-type polarizer further comprises a substrate and has a film shape.

16. A display device comprising the dye-type polarizer of claim 9.

* * * * *